(12) United States Patent
Azorin

(10) Patent No.: US 11,994,708 B2
(45) Date of Patent: May 28, 2024

(54) ULTRA-FLAT LIGHTING PANEL

(71) Applicant: DISPLAY LIGHT, Montauban (FR)

(72) Inventor: Didier Azorin, Montauban (FR)

(73) Assignee: DISPLAY LIGHT, Montauban (FR)

( * ) Notice: Subject to any disclaimer, the term of this patent is extended or adjusted under 35 U.S.C. 154(b) by 59 days.

(21) Appl. No.: 17/266,083

(22) PCT Filed: Jul. 26, 2019

(86) PCT No.: PCT/EP2019/070259
§ 371 (c)(1),
(2) Date: Feb. 4, 2021

(87) PCT Pub. No.: WO2020/030451
PCT Pub. Date: Feb. 13, 2020

(65) Prior Publication Data
US 2021/0294016 A1    Sep. 23, 2021

(30) Foreign Application Priority Data

Aug. 9, 2018 (FR) ...................................... 1857403

(51) Int. Cl.
| | |
|---|---|
| F21V 8/00 | (2006.01) |
| F21V 1/00 | (2006.01) |
| F21Y 103/10 | (2016.01) |
| F21Y 115/10 | (2016.01) |

(52) U.S. Cl.
CPC .............. *G02B 6/0051* (2013.01); *F21V 1/00* (2013.01); *G02B 6/006* (2013.01); *G02B 6/0088* (2013.01); *F21Y 2103/10* (2016.08); *F21Y 2115/10* (2016.08)

(58) Field of Classification Search
CPC ....... G02B 6/0051; G02B 6/006; G09F 13/18; G02F 1/133615
See application file for complete search history.

(56) References Cited

U.S. PATENT DOCUMENTS

| | | | |
|---|---|---|---|
| 4,602,191 A | 7/1986 | Davila | |
| 5,444,456 A | 8/1995 | Ohta et al. | |
| 9,611,989 B1 | 4/2017 | Isaacson et al. | |
| 9,945,539 B1 * | 4/2018 | Su | ........................ A47G 1/0622 |

(Continued)

FOREIGN PATENT DOCUMENTS

| | | |
|---|---|---|
| EP | 2835574 A1 | 2/2015 |
| ES | 1227619 U | 4/2019 |

(Continued)

OTHER PUBLICATIONS

Search Report from French Intellectual Property Office on corresponding FR application (FR1857403) dated Feb. 20, 2019.

(Continued)

*Primary Examiner* — Eric T Eide
(74) *Attorney, Agent, or Firm* — Alumen IP Law PC

(57) ABSTRACT

The invention relates to an ultra-flat lighting panel comprising a light-diffusing plate, at least one support strip, extending along a plane parallel to the longitudinal plane of the diffusing plate, and at least one strip of light-emitting diodes mounted on said at least one support strip perpendicular to at least one edge surface of the diffusing plate such as to emit light from the light-emitting diodes into said edge surface.

19 Claims, 4 Drawing Sheets

(56) References Cited

U.S. PATENT DOCUMENTS

| | | |
|---|---|---|
| 2005/0088312 A1 | 4/2005 | Fulwiler |
| 2005/0122716 A1* | 6/2005 | Castelli ............... G02B 6/0096 |
| | | 362/227 |
| 2008/0104870 A1 | 5/2008 | Alden |
| 2008/0285274 A1* | 11/2008 | Jung .................... G02B 6/0076 |
| | | 362/240 |
| 2010/0226117 A1 | 9/2010 | Krans et al. |
| 2012/0062816 A1* | 3/2012 | Tsubaki ............... G02B 6/0068 |
| | | 362/613 |
| 2012/0305770 A1 | 12/2012 | Minera |
| 2013/0169886 A1* | 7/2013 | Kuromizu ......... G02F 1/133608 |
| | | 348/739 |
| 2013/0250559 A1* | 9/2013 | Hawkins ............... F21V 33/008 |
| | | 362/183 |
| 2014/0310998 A1* | 10/2014 | Shoveller ............... G09F 13/18 |
| | | 40/541 |
| 2014/0340902 A1 | 11/2014 | Nelson |
| 2015/0253484 A1* | 9/2015 | Araki ................... G02B 6/0091 |
| | | 362/609 |
| 2015/0325157 A1* | 11/2015 | Jumblatt ................ G09F 19/20 |
| | | 40/581 |
| 2016/0148558 A1 | 5/2016 | Ernst et al. |
| 2016/0293071 A1 | 10/2016 | Shoveller |
| 2017/0105465 A1 | 4/2017 | Kuddo |
| 2017/0178550 A1 | 6/2017 | Miller |
| 2017/0249878 A1 | 8/2017 | Frey |
| 2018/0082615 A1 | 3/2018 | Cheung |
| 2018/0212116 A1* | 7/2018 | Bastiani ................ G08G 5/065 |
| 2019/0082805 A1 | 3/2019 | Tong |
| 2020/0200338 A1 | 6/2020 | Li |
| 2020/0335660 A1* | 10/2020 | Kang .................... F21S 43/243 |
| 2021/0164639 A1 | 6/2021 | Choi et al. |
| 2021/0372601 A1 | 12/2021 | Palzkill |
| 2022/0157206 A1 | 5/2022 | Kay et al. |
| 2022/0279874 A1 | 9/2022 | Bergman et al. |

FOREIGN PATENT DOCUMENTS

| | | |
|---|---|---|
| WO | WO 2014/094081 A2 | 6/2014 |
| WO | WO 2014/119148 A1 | 8/2014 |
| WO | WO 2018/130429 A1 | 7/2018 |

OTHER PUBLICATIONS

International Search Report and Written Opinion on corresponding PCT application (PCT/EP2019/070259) from International Searching Authority (EPO) dated Sep. 11, 2019.
International Search Report and Written Opinion on corresponding PCT application (PCT/EP2020/083721) from International Searching Authority (EPO) dated Feb. 23, 2021.
Non-Final Office Action on related US application (U.S. Appl. No. 17/776,970) dated Apr. 11, 2023.
Final Office Action on related US application (U.S. Appl. No. 17/776,970) dated Nov. 29, 2023.

* cited by examiner

ULTRA-FLAT LIGHTING PANEL

TECHNICAL FIELD

The present invention is directed to the field of lighting and more particularly relates to an ultra-flat LED lighting panel. In particular, the invention aims at allowing easy use of a LED lighting panel in a signage element made of fabric.

BACKGROUND

In the field of signage, it is known to use different types of supports. In particular, it is known to use valances attached on blinds, called "blind valances".

In an existing blind valance solution, it is known to insert a light panel inside a valance made of fabric in which openings, representing for example letters, are formed flush with the light panel, openings through which light emitted by the light panel propagates.

The drawback of existing lighting panels lies in their thickness. Indeed, in a common solution of existing panel, the panel comprises a rectangular or square metal frame defining a cavity, closed on one side by an opaque plate and on the other side by an opalescent plate, into which one or more light emitting diode strips are mounted so that light bounces off the frame walls and the opaque plate so as to exit the panel through the opalescent plate.

As the thickness of such a lighting panel is on average more than 3 cm, this type of panel makes the blind valance thick and unattractive. In addition, this type of lighting panel can have a relatively large mass, especially provided by the metal frame, which can damage the blind to which the valance is attached.

Therefore, there is a need for a simple, reliable and effective solution that can at least partially overcome the aforesaid drawbacks.

SUMMARY

To that end, one first object of the invention is an ultra-flat lighting panel, said lighting panel comprising a light diffusion plate, the lighting panel being remarkable in that it further comprises at least one support strip, extending along a plane parallel to the longitudinal plane of the diffusion plate, and at least one light emitting diode strip mounted to said at least one support strip flush with at least one slice of the diffusion plate so as to emit light from the light emitting diodes into said slice.

The at least one light emitting diode strip thus extends into the extension (i.e. thickness) of the diffusion plate, thereby limiting the thickness of the panel substantially to the thickness of the diffusion plate. The at least one support strip is a simple, reliable and effective means for attaching the at least one light emitting diode strip and ensuring that the light emitting diodes project their light into the slice of the diffusion plate, particularly by being positioned at a distance from the slice. Such a configuration makes it possible to significantly reduce the thickness of the lighting panel, for example to a value of less than 1 cm, preferably less than 6 mm, depending in particular on the thickness of the diffusion plate.

Preferably, the distance between the light emitting diodes and the slice of the diffusion plate is less than 2 mm in order to allow efficient light diffusion in the diffusion plate.

Advantageously, the thickness of the diffusion plate is preferably less than 1 cm, preferably less than 5 mm, still preferably around 2 mm.

Still preferably, the diffusion plate is of rectangular or square shape.

Advantageously, the at least one support strip is mounted to one side of the diffusion plate so that it extends from one edge of the diffusion plate.

Advantageously, at least one light emitting diode strip is mounted to a length of the diffusion plate.

According to one aspect of the invention, the at least one light emitting diode strip is sealed, for example by means of a silicone coating.

In a first embodiment, one of the two faces of the diffusion plate being called a light emitting face and the other face being called a light-blocking face, the lighting panel further comprises an opalescent plate extending on (i.e. flush with) the emission face of the diffusion plate, preferably over the entire surface of the emission face of the diffusion plate. The opalescent plate is especially used to improve light diffusion and to mask any markings on the diffusion plate, for example black spots resulting from the laser manufacture of the diffusion plate.

The opalescent plate may for example be made of a thermoplastic polymer, for example polyvinyl chloride PVC, polymethyl methacrylate (Plexiglas) or polycarbonate.

Preferably, the thickness of the opalescent plate is less than or equal to 2 mm.

Preferably, a space may be formed between the diffusion plate and the opalescent plate, for example between 1 and 2 mm, in order to improve light diffusion outwardly of the lighting panel and to improve masking of possible markings.

Advantageously, the lighting panel further comprises an opaque layer extending on the blocking side of the diffusion plate, for example adhesively bonded to the blocking face of the diffusion plate. The opaque layer may be, for example, a sheet with a thickness less than or equal to 1 mm, or a plate with a thickness greater than 1 mm. The opaque layer may be made of polyvinyl chloride (PVC), polymethyl methacrylate (Plexiglas) or polycarbonate.

Still advantageously, the lighting panel also comprises a black film or a translucent diffuse part extending on the face of the opaque layer opposite to the contact face with the blocking side of the diffusion plate, in order to totally block light. Preferably the black film or translucent diffuse part extends preferably on the entire said surface of the opaque layer.

In a second embodiment, as both faces of said lighting panel are so-called light emitting faces, the lighting panel further comprises a first opalescent plate, extending on one of the light emitting faces of the diffusion plate, and a second opalescent plate, extending on the other light emitting face of the diffusion plate.

Preferably, a space may be formed between the diffusion plate and the first opalescent plate, on the one hand, and between the diffusion plate and the second first opalescent plate, on the other hand, in order to improve light diffusion outwardly of the lighting panel through its two faces.

Preferably, the lighting panel further comprises at least one opaque strip covering the at least one light emitting diode strip such that the at least one light emitting diode strip is disposed between the slice of the diffusion plate, flush with which the at least one light emitting diode strip extends, and said at least one opaque strip. The opaque strip may be made of, for example, aluminum or an opaque adhesive material. Preferably, the opaque strip is attached on the entire slice of the lighting panel so as to make it sealed and to hold the elements of the panel, in particular the opalescent plate(s) and the opaque layer if any.

Finally, the invention relates to a piece of fabric comprising at least two thicknesses forming at least one pocket into which a lighting panel as described above is inserted. The piece of fabric may be an element of a sign, for example of the blind valance type, a banner or wall flag, or a canvas of an object such as, for example, a parasol. Preferably, the piece of fabric is a blind canvas made of, for example, acrylic and/or polyester.

BRIEF DESCRIPTION OF THE DRAWINGS

The invention will be better understood upon reading the following description, given only by way of example, and referring to the appended drawings given by way of non-limiting examples, in which identical references are given to similar objects and in which.

It should be noted that the figures set out the invention in a detailed manner in order to implement the invention, wherein said figures can of course be used to better define the invention if necessary.

DETAILED DESCRIPTION

The lighting panel according to the invention may be advantageously inserted into a fabric element, such as for example a blind valance, a banner, a wall flag or a parasol canvas. Of course, any other type of lighting is also covered by the present patent application, in particular lighting of suspended ceilings, panels, walls, etc.

Figure 1:
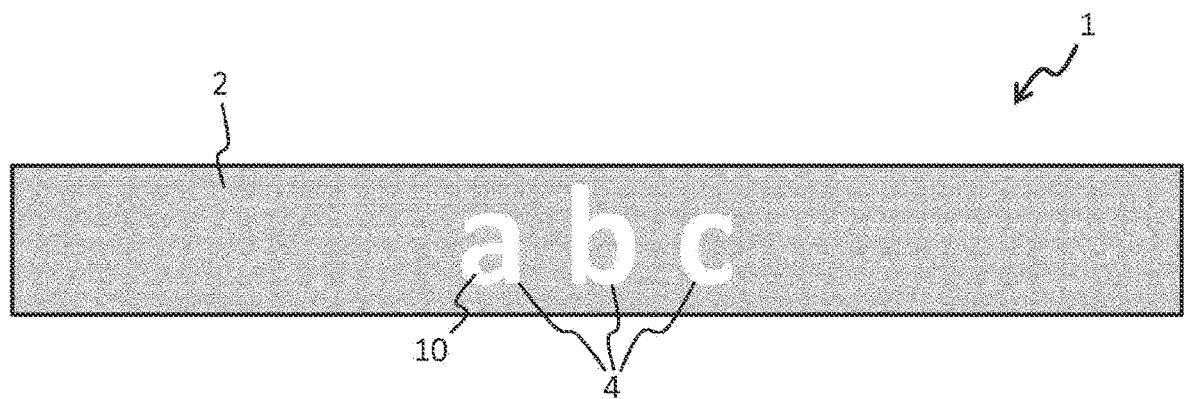
FIG. 1 schematically illustrates one embodiment of a blind valance comprising a lighting panel according to the invention.
Figure 2:
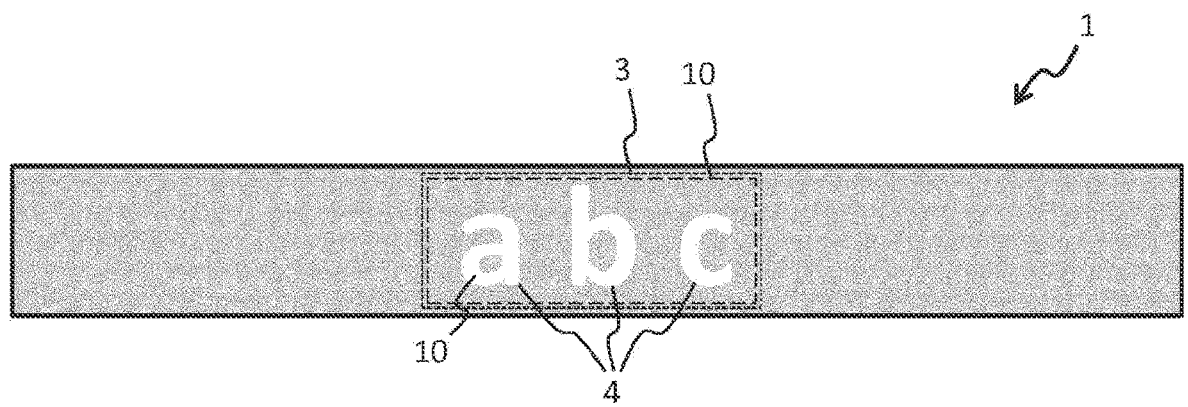
FIG. 2 is a partially transparent view of the blind valance of FIG. 1, FIG. 3 schematically illustrates an example of a lighting panel according to the invention.

An example of a blind valance 1 with a piece of fabric 2 in which a pocket 3 is formed is represented in FIG. 1 and FIG. 2. Openings 4 as letters "a b c" are formed on one face of the piece of fabric 2 and a lighting panel 10 according to the invention is inserted into pocket 3.

Figure 3:
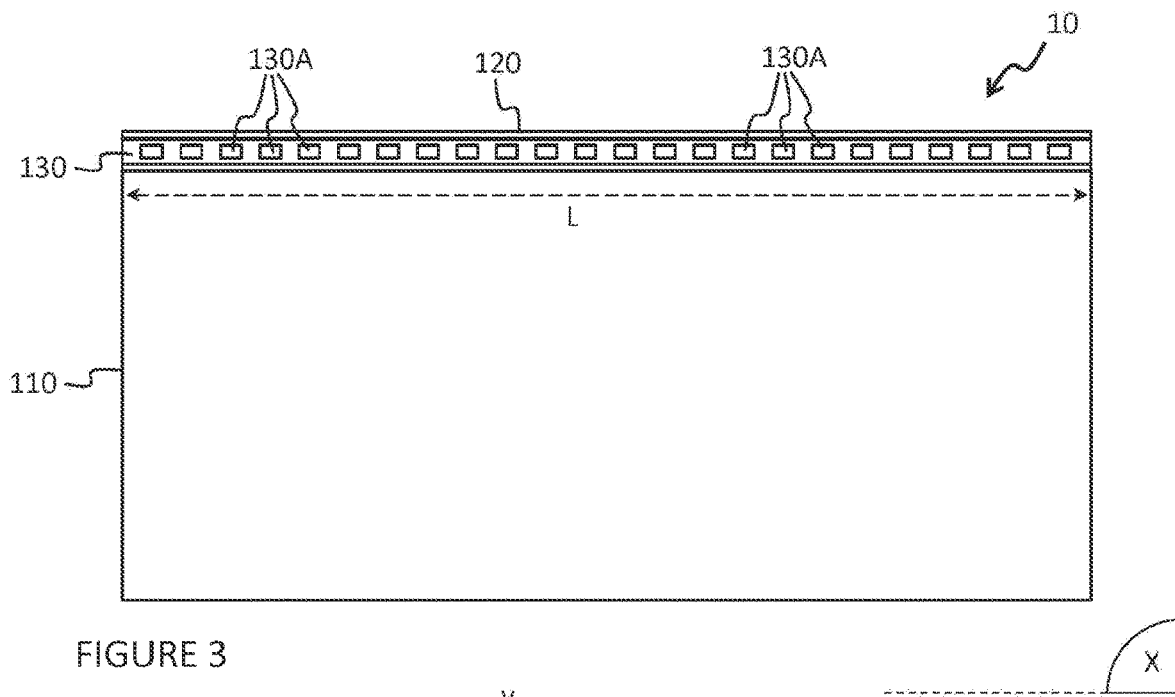
Figure 4:
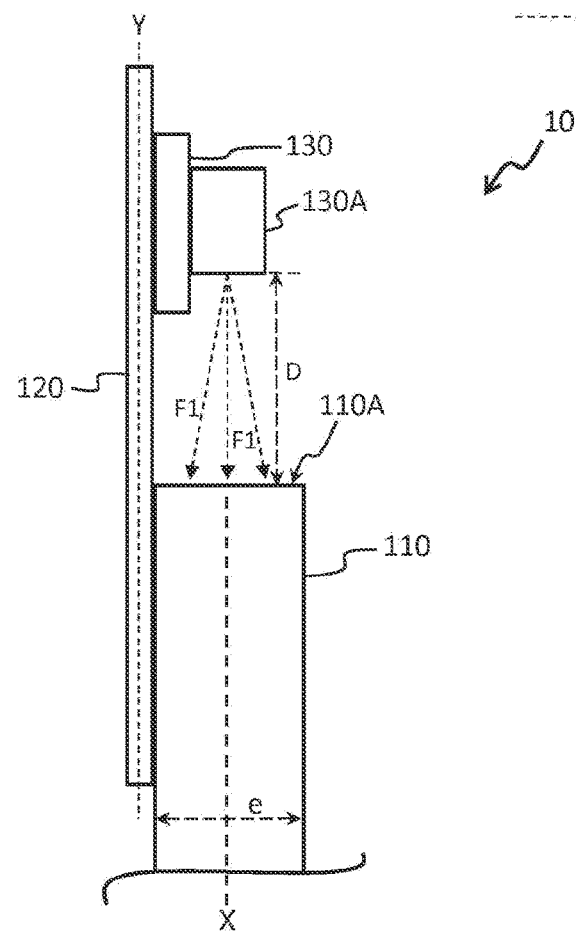
FIG. 4 is a partial close-up side view of the lighting panel of FIG. 3.

A partial view of an example of a light panel 10 according to the invention is represented in FIG. 3 and FIG. 4. Lighting panel 10 according to the invention is an ultra-flat lighting panel 10 using LED technology known per se.

In this non-limiting example, the lighting panel 10 comprises a light diffusion plate 110, a support strip 120 and a light emitting diode strip 130 comprising a plurality of light emitting diodes 130A, preferably evenly disposed over the entire length L of the diffusion plate 110.

With reference to FIG. 4, the light diffusion plate 110 comprises a slice 110A defining the thickness e of said diffusion plate 110. Preferably, the thickness e of the diffusion plate 110 is less than 1 cm, preferably less than 5 mm, preferably in the order of 2 mm.

In this preferred example, the diffusion plate 110 is of rectangular shape and has two faces opposite to each other. It will be noted that in another embodiment, the diffusion plate 110 but could have any other shape (square, circular . . . ).

The support strip 120 is attached, at an attachment zone, to one face of the diffusion plate 110, preferably along its entire length L, for example by bonding, so that it extends, at a free zone, from one edge of the diffusion plate 110, along a plane Y parallel to the longitudinal plane X of the diffusion plate 110. Preferably, the thickness of the support strip 120 is between 0.5 and 2 mm. The support strip 120 may, for example, be made of a plastic material.

The LED strip 130 is attached to the support strip 120 at its free end, for example by bonding, so that it extends flush with (i.e. facing) slice 110A of the diffusion plate 110 and so that the LEDs 130A emit especially a light flux F1 in said slice 110A when they are electrically powered. Preferably, the light emitting diode strip 130 is sealed, for example with a silicone coating. A distance D is formed between the LEDs 130A and the edge of the slice 110A. Further preferably, the distance D between the light emitting diodes 130A and the slice 110A of the diffusion plate 110 is less than 3 mm, preferably less than 2 mm.

Figure 5:
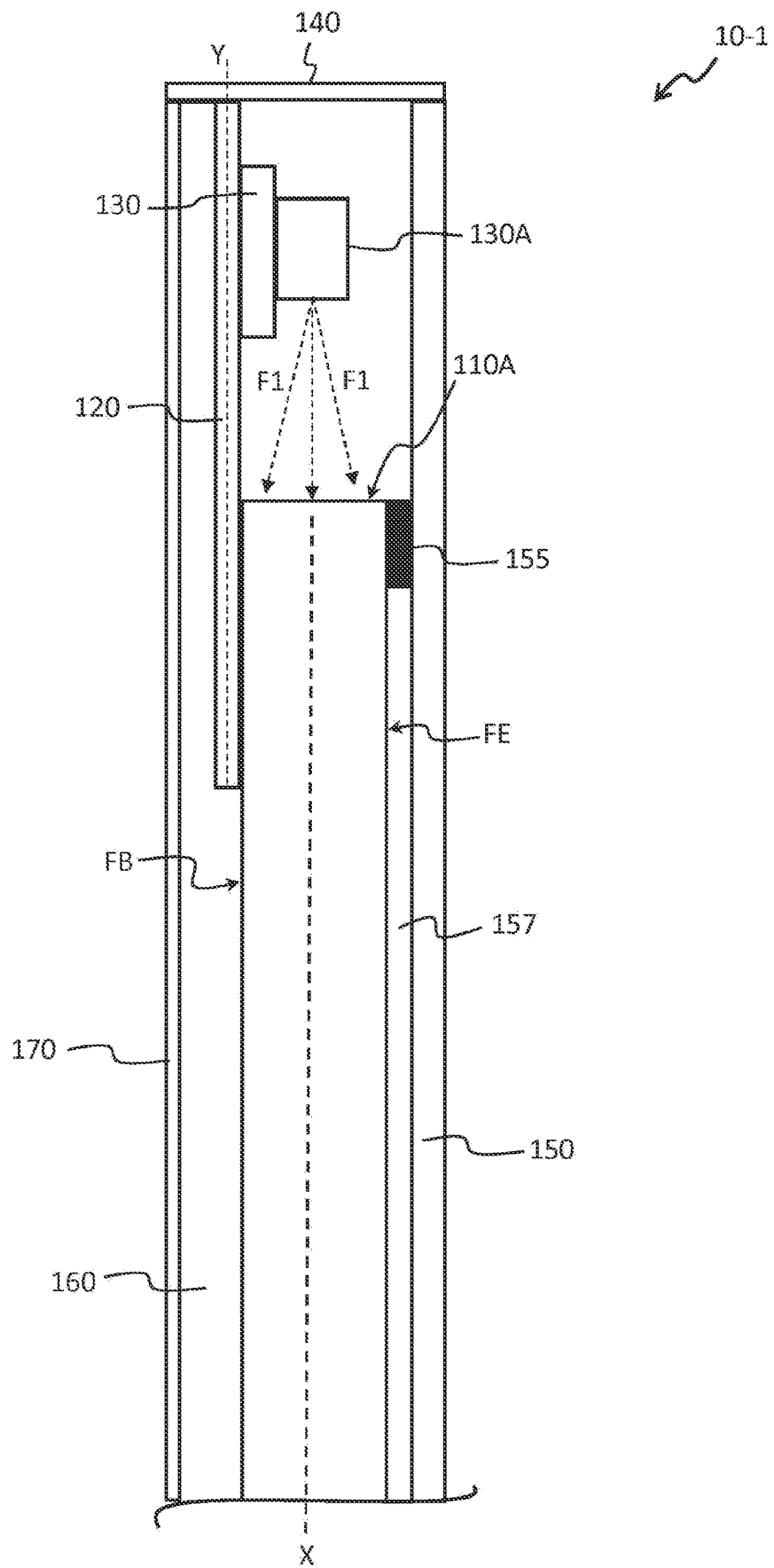
FIG. 5 illustrates a first embodiment of the lighting panel of FIG. 3.

A first embodiment of the lighting panel 10-1 according to the invention is represented in FIG. 5. In this embodiment, the lighting panel 10-1 emits light outwardly through only one of its two faces. One face of diffusion plate 110 is designated as an "emission face" FE, the other face of diffusion plate 110 being designated as a "blocking face" FB.

For this purpose, the lighting panel 10-1 comprises an opaque strip 140, for example made of aluminum, attached along the entire length of the support strip 120 so that said light emitting diode strip 130 is disposed between slice 110A of diffusion plate 110, flush with which said light emitting diode strip 130 extends, and said opaque strip 140.

Still with reference to FIG. 5, the lighting panel 10-1 comprises an opalescent plate 150 and an opaque layer 160.

The opalescent plate 150 extends on the entire surface of the emission face FE of the diffusion plate 110 and has the function of improving light diffusion and, when the diffusion plate 110 has markings, for example black spots due to its laser manufacture, to mask these markings from outside of the lighting panel 10-1. The opalescent plate 150 may for example be made of PVC, Plexiglas or polycarbonates. Preferably, the thickness of the opalescent plate 150 is less than 2 mm.

In this example, the opalescent plate 150 is attached to the diffusion plate 110 using double-sided adhesive tape 155. Such tape 155, preferably disposed around the entire periphery of the emission face FE of the diffusion plate 110, allows a space 157 to be formed between the diffusion plate 110 and the opalescent plate 150, for example from 1 to 2 mm, which improves light diffusion outwardly of the lighting panel 10-1 and allows masking of any markings made on the diffusion plate 110 to be improved, in order to make them invisible from outside of the lighting panel 10-1.

In this example, the opalescent plate 150 extends up to the support strip 120 and the opaque strip 140 covers both the slice of the support strip 120 and the edge of the opalescent plate 150 so as to block light on the opposite side to the slice 110A of the diffusion plate 110 so that light emitted by the light emitting diodes 130A is essentially directed into the slice 110A of the diffusion plate 110. The opaque strip 140 may advantageously be disposed on the entire side surface (i.e. the slice) of the lighting panel 10-1 to seal it and hold the elements of the lighting panel 10-1 between them, especially the opalescent plate 150 and the opaque layer 160.

Preferably, the opaque layer 160 extends over the entire surface of the blocking face FB of the diffusion plate 110. In particular, the opaque layer 160 may be attached to the blocking face FB of the diffusion plate 110, for example by bonding. The function of the opaque layer 160 is to block most of the light emitted by the light emitting diodes 130A in the diffusion plate 110. The opaque layer 160 may for example be made of polyvinyl chloride (PVC), Plexiglas or polycarbonates. Preferably, the thickness of the opaque layer 160 is less than or equal to 1 mm.

Optionally, as shown in FIG. 5, a black film or a translucent diffuse part 170 may be attached to the face of the opaque layer 160 that is opposite to the face extending facing the surface of the blocking face FB of the diffuser plate 110 in order to block light rays that could have passed through the opaque layer 160. In the example of FIG. 5, the black film or translucent diffuse part 170 also covers the opaque layer 160. Preferably, the thickness of the black film or translucent diffuse part 170 is less than 1 mm.

In this example, the support strip 120 is blocked between the opaque layer 160 and the diffusion plate 110, for example by pinching, with or without bonding. It will be noted that in another embodiment of the lighting panel 10-1, the support strip 120 could be attached on the opaque layer 160 or directly on the slice of the diffusion plate 110.

Lighting panel 10 according to the invention is particularly adapted to be inserted into a pocket formed in a piece of fabric such as, for example, a sign of the blind valance 1 or flag type. In such uses, it may be necessary to emit light on both faces of the sign. For example, in the case of a wall flag or blind valance 1 type sign, both faces of the sign may be desired to be lighted.

Figure 6:
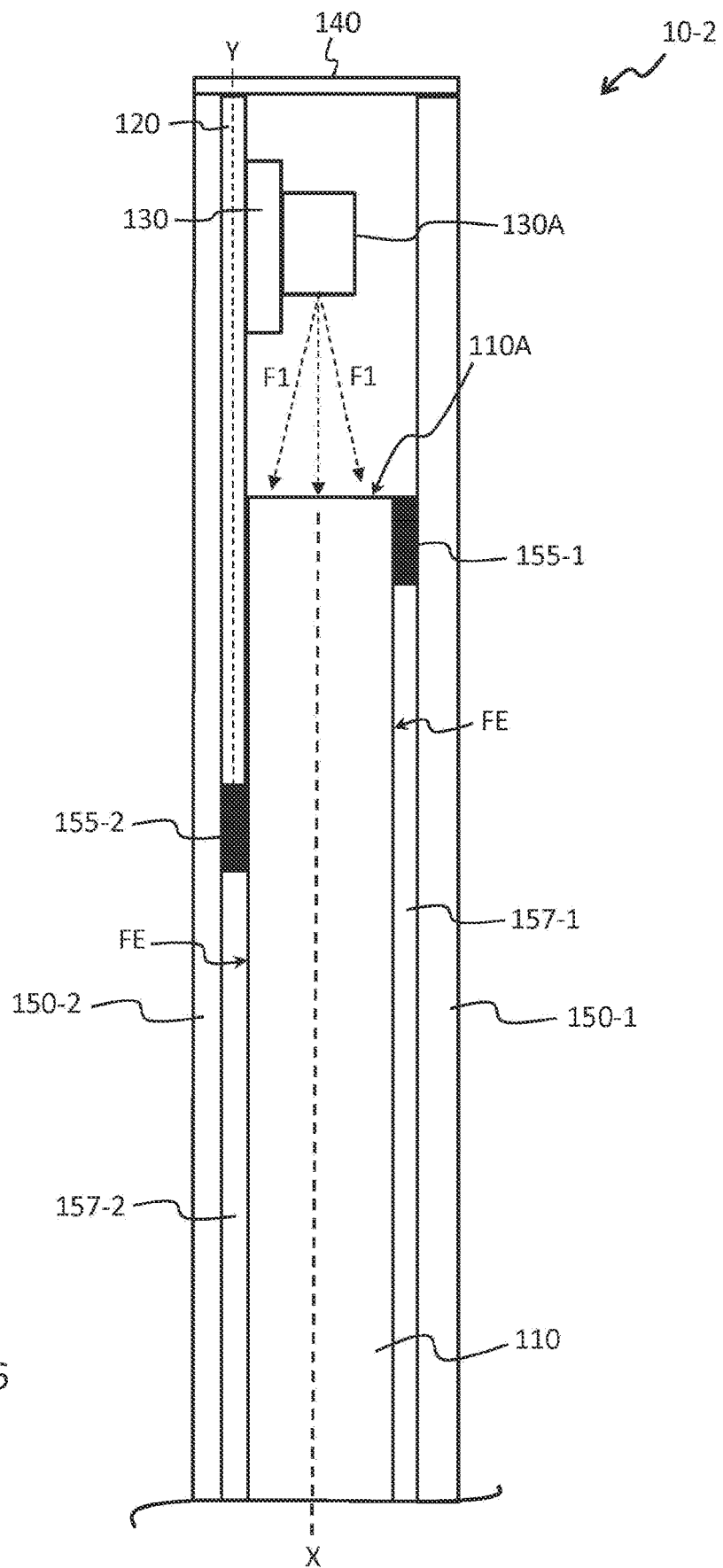
FIG. 6 illustrates a second embodiment of the lighting panel of FIG. 3.

A second embodiment of the lighting panel 10-2 according to the invention is represented in FIG. 6. In this embodiment, the lighting panel 10-2 emits light outwardly through its two faces. In this configuration, both faces of the diffusion plate 110 are so-called light emitting faces FE.

In this configuration, the lighting panel 10-2 comprises, in addition to the diffusion plate 110, the support strip 120 and the light emitting diode strip 130, an opaque strip 140, a first opalescent plate 150-1 and a second opalescent plate 150-2.

The first opalescent plate 150-1 extends on the entire surface of the emission face FE of the diffusion plate 110 facing which it extends. The first opalescent plate 150-1 may, for example, be made of PVC, Plexiglas or polycarbonates. Preferably, the thickness of the first opalescent plate 150-1 should be less than 2 mm.

In this example, the first opalescent plate 150-1 is attached to the diffusion plate 110 with double-sided adhesive tape 155-1. Such a tape 155-1, preferably disposed around the entire periphery of the emission face FE, makes it possible to form a space 157-1 between the diffusion plate 110 and the first opalescent plate 150-1, for example 1 to 2 mm, which improves light diffusion outwardly of the lighting panel 10-2 through said first opalescent plate 150-1 and makes it possible to mask possible markings made on the diffusion plate 110. In this preferred example, the first opalescent plate 150-1 extends up to the support strip 120.

The second opalescent plate 150-2 extends over the entire surface of the other emission face FE of the diffusion plate 110, facing which it extends. The second opalescent plate 150-2 may be made, for example, of PVC, Plexiglas or polycarbonate. Preferably, the thickness of the second opalescent plate 150-2 is less than 2 mm.

In this example, the second opalescent plate 150-2 is attached to the diffusion plate 110 with double-sided adhesive tape 155-2. Such a tape 155-2, preferably disposed around the entire periphery of the emission face FE, allows a space 157-2 to be formed between the diffusion plate 110 and the second opalescent plate 150-2, for example from 1 to 2 mm, which improves light diffusion outwardly of the lighting panel 10-2 through the second opalescent plate 150-2.

The second opalescent plate 150-2 extends up to the support strip 120 and the opaque strip 140 covers both the slice of the support strip 120, the slice of the first opalescent plate 150-1 and the slice of the second opalescent plate 150-2 so as to block light on the opposite side to the slice 110A of the diffusion plate 110 so that light emitted from the light emitting diodes 130A is directed essentially into the slice 110A of the diffusion plate 110. The opaque strip 140 may advantageously be disposed on the entire surface of the panel (i.e. the entire side surface) of the lighting panel 10-2 in order to seal it and to close the lighting panel 10-2 by holding the first opalescent plate 150-1 and the second opalescent plate 150-2.

In this example, the support strip 120 is blocked between the second opalescent plate 150-2 and the diffusion plate 110, for example by pinching, with or without bonding. It will be noted that in another embodiment of the lighting panel 10-2, the support strip 120 could be attached to the opaque layer 160 or directly to the slice of the diffusion plate 110.

The lighting panel 10 according to the invention thus advantageously has a thickness of less than 1 cm, preferably less than 6 mm, so that it can be easily inserted into a pocket made between two layers of fabric, in particular in a sign of the blind valance, banner, wall flag type or a parasol canvas.

The present invention is not limited to the embodiments described herein. It will be noted in particular that the shapes and dimensions of the elements of the lighting panel could be different without being restrictive to the scope of the present invention.

The invention claimed is:

1. A lighting panel, said lighting panel comprising a light diffusion plate defining a longitudinal plane having a first face and a second face opposing the first face, at least one support strip extending integrally along a plane parallel to the longitudinal plane of the diffusion plate, and at least one light emitting diode strip mounted to said at least one support strip in a plane parallel to the longitudinal plane of the diffusion plate, wherein the at least one light emitting diode strip sits flush with at least one slice of the diffusion plate so as to emit light from light emitting diodes of said at least one light emitting diode strip into said slice, and wherein said first face is a first light emitting face and said second face is a second light emitting face, said lighting panel further comprising a first opalescent plate extending along the first light emitting face of the diffusion plate and a second opalescent plate extending along the second light emitting face of the diffusion plate.

2. The lighting panel according to claim 1, wherein the light emitting diode strip is spaced from the slice of the diffusion plate by a distance that is less than 2 mm.

3. The lighting panel according to claim 1, wherein the at least one light emitting diode strip is mounted to a length of the diffusion plate.

4. The lighting panel according to claim 1, wherein the at least one light emitting diode strip is sealed.

5. The lighting panel according to claim 1, wherein the first opalescent plate extending along a side of the first light emitting face of the diffusion plate.

6. The lighting panel according to claim 5, said lighting panel further comprising an opaque layer extending along a side of the light-blocking face of the diffusion plate.

7. The lighting panel according to claim 6, further comprising a black film or a translucent diffuse part extending along the opaque layer.

8. The lighting panel according to claim 1, further comprising at least one opaque strip covering the at least one light emitting diode strip such that said at least one light emitting diode strip is disposed between the slice of the diffusion plate and said at least one opaque strip.

9. A piece of fabric comprising at least one pocket and the lighting panel according to claim 1 is located within the at least one pocket.

10. A lighting panel comprising:
a light diffusion plate defining a longitudinal plane having a first face and a second face opposing the first face;
a support strip extending integrally along a plane parallel to the longitudinal plane of the diffusion plate;
a light emitting diode strip comprising a plurality of light emitting diodes, said light emitting diode strip being mounted to said support strip in a plane parallel to the longitudinal plane of the light diffusion panel;
wherein the light emitting diode strip sits flush with at least one slice of the diffusion plate so as to emit light flux from the light emitting diodes in a direction generally parallel to a surface of the support strip where the light emitting diode strip is mounted so as to travel into said at least one slice; and
wherein said first face is a first light emitting face and said second face is a second light emitting face, said lighting panel further comprising a first opalescent plate extending along the first light emitting face of the diffusion plate and a second opalescent plate extending along the second light emitting face of the diffusion plate.

11. The lighting panel of claim 10, wherein a thickness of the lighting panel measured transversely to the longitudinal plane is less than 1 cm.

12. The lighting panel of claim 10, wherein the light emitting diode strip is mounted to said support strip on said plane parallel to the longitudinal plane of the diffusion plate.

13. The lighting panel of claim 12, wherein the at least one slice of the diffusion plate has a thickness and wherein the light emitting diode strip and the plurality of light emitting diodes project from the support strip a distance less than the thickness of the at least one slice of the diffusion plate.

14. The lighting panel of claim 13, wherein the first opalescent plate having an end that terminates at an end where an end of the support strip terminates.

15. The lighting panel of claim 14, wherein an opaque strip contacts the end of the first opalescent plate and the end of the support strip.

16. A piece of fabric comprising at least one pocket and the lighting panel according to claim 10 is located within the at least one pocket.

17. A lighting panel comprising:
a light diffusion plate defining a longitudinal plane having a first face and a second face opposing the first face;
a support strip having a planar surface integrally parallel to the longitudinal plane of the diffusion plate;
a light emitting diode strip comprising a plurality of light emitting diodes, said light emitting diode strip being mounted to the planar surface of the support strip in a plane parallel to the longitudinal plane of the light diffusion plate;
wherein the light emitting diode strip and the plurality of light emitting diodes project from the planar surface of the support strip along a direction perpendicular to the longitudinal plane of the light diffusion plate such that the light emitting diodes project further in the direction perpendicular to the longitudinal plane than the light emitting diode strip;
wherein the light emitting diodes are arranged to emit light flux into at least one slice of the diffusion plate; and
wherein said first face is a first light emitting face and said second face is a second light emitting face, said lighting panel further comprising a first opalescent plate extending along the first light emitting face of the diffusion plate and a second opalescent plate extending along the second light emitting face of the diffusion plate.

18. The lighting panel of claim 17, wherein the light flux is emitted generally parallel to planar surface of the support strip.

19. The lighting panel of claim 17, wherein a thickness of the lighting panel measured transversely to the longitudinal plane is less than 1 cm.

\* \* \* \* \*